United States Patent [19]

Heiskari et al.

[11] Patent Number: 5,708,975
[45] Date of Patent: Jan. 13, 1998

[54] METHOD FOR REACTING TO DISTURBANCE IN A MOBILE COMMUNICATION SYSTEM

[75] Inventors: Mika Heiskari, Liminka; Jussi Löppönen, Helsinki, both of Finland

[73] Assignee: Nokia Telecommunications Oy, Espoo, Finland

[21] Appl. No.: 596,149
[22] PCT Filed: Jun. 5, 1995
[86] PCT No.: PCT/FI95/00318
   § 371 Date: Feb. 5, 1996
   § 102(e) Date: Feb. 5, 1996
[87] PCT Pub. No.: WO95/34179
   PCT Pub. Date: Dec. 14, 1995

[30] Foreign Application Priority Data

Jun. 6, 1994 [FI] Finland ............ 942666

[51] Int. Cl.$^6$ ............ H04B 7/26; H04B 17/00
[52] U.S. Cl. ............ 455/63; 455/1; 455/54.1
[58] Field of Search .............. 455/33.1, 54.1, 455/56.1, 63, 67.1, 68, 70–79, 50.1, 54.2, 67.3

[56] References Cited

U.S. PATENT DOCUMENTS 4,335,468  6/1982  Foster et al. ........................ 455/63

FOREIGN PATENT DOCUMENTS

| 0 310 379 | 4/1989 | European Pat. Off. . | |
| 1-72633 | 3/1989 | Japan | 455/63 |
| 1-170127 | 7/1989 | Japan | 455/63 |
| 469 542 | 7/1993 | Sweden . | |
| 469 736 | 8/1993 | Sweden . | |

*Primary Examiner*—Nguyen Vo
*Attorney, Agent, or Firm*—Cushman Darby & Cushman Intellectual Property Group of Pillsbury Madison & Sutro LLP

[57] ABSTRACT

A method for reacting to disturbance on an uplink frequency in a mobile communication system which comprises a mobile communication network which includes at least one base station and a mobile services switching center, as well as at least one mobile station which communicates with base station on an uplink, i.e. receive, frequency, and on a downlink, i.e. transmit, frequency of base station. In order to react advantageously to an uplink disturbance, the following procedure will be followed: a mobile communication network detects the disturbance on an uplink frequency, the mobile communication network informs a mobile station of disturbance by using a downlink frequency and commands the mobile station to listening mode in which the mobile station stays on the same downlink frequency and receives information from the base station, the mobile station shifts to listening mode.

15 Claims, 2 Drawing Sheets

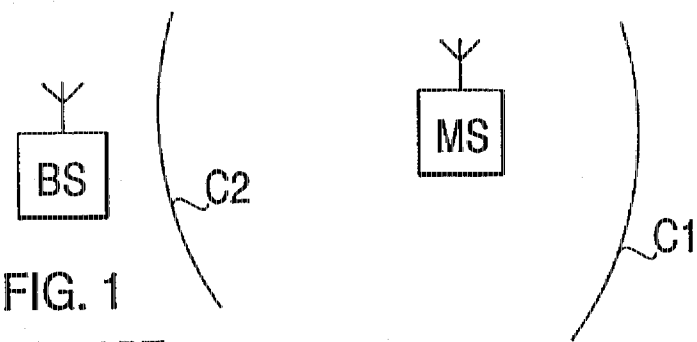
FIG. 1
PRIOR ART
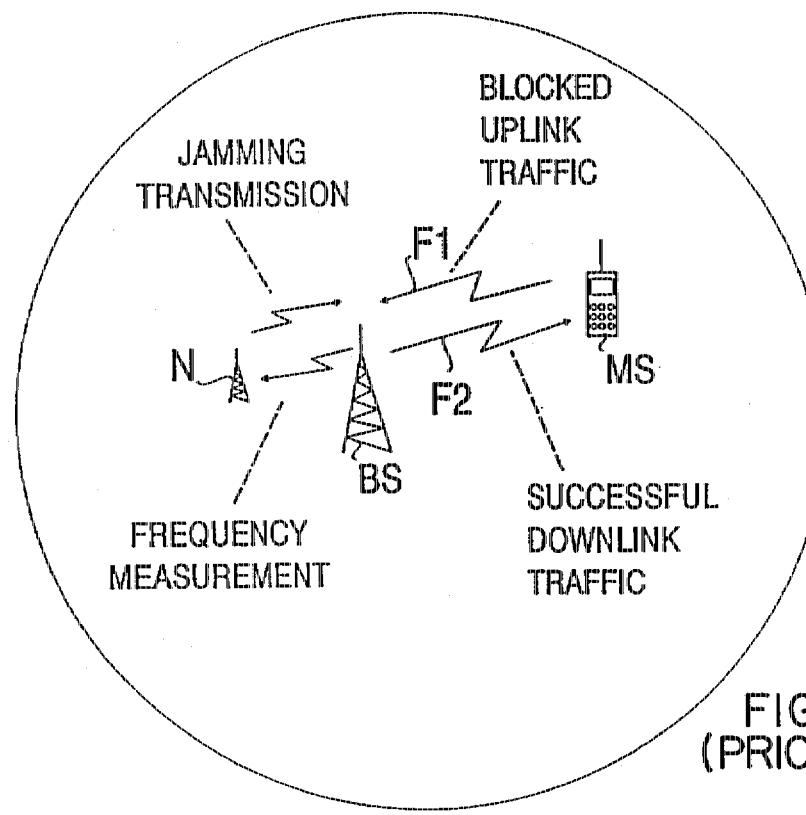
FIG. 2
(PRIOR ART)
FIG. 3
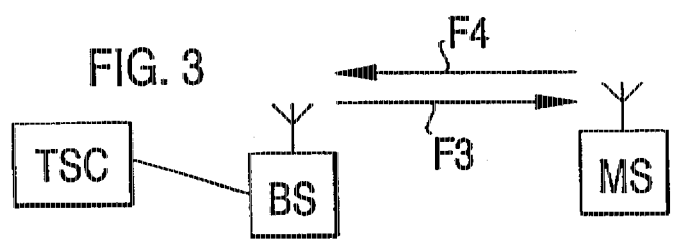
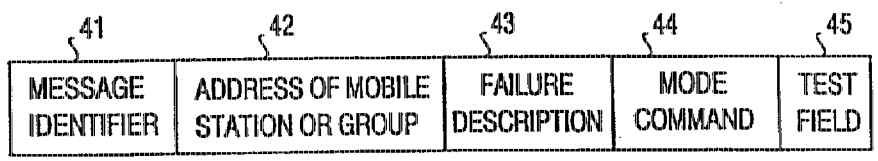
FIG. 4

METHOD FOR REACTING TO DISTURBANCE IN A MOBILE COMMUNICATION SYSTEM

This application claims benefit of international application PCT/ FI95/00318, filed Jun. 5, 1995.

FIELD OF THE INVENTION

The invention relates to a method for reacting to disturbance on an uplink frequency in a mobile communication system which comprises a mobile communication network which includes at least one base station and a mobile services switching center, as well as at least one mobile station which communicates with the base station on an uplink, i.e. receive, frequency, and on a downlink, i.e. transmit, frequency of the base station.

The invention relates to mobile communication systems and especially trunked mobile radio systems which comprise control centers, base stations as well as mobile stations, typically radiotelephones, and which systems are cellular, and which system has in each cell one or more radio channels on certain frequencies and which channels are possibly split into time slots. In each cell, i.e. base station, one or more radio channels are used for signalling, while the rest are in traffic channel use.

BACKGROUND OF THE INVENTION

Present mobile communication systems have a feature according to which mobile stations do not accept a control channel which does not respond to their signalling messages. In cases wherein mobile stations do not receive a response to messages they have transmitted to base stations, they begin to search for a new control channel to use. Furthermore, in the present mobile communication systems, mobile stations are not at all informed of failures in the uplink communications, nor of reasons causing these failures, but they themselves simply notice that a base station and/or a system is not able to respond in a sensible manner to messages and signalling transmitted by the mobile station.

In such a case, as a mobile station notices that signalling between it and the system is not working, the mobile station cannot always in all cases independently infer the reasons causing the break. If a base station transmission is interpretable at a mobile station, but the mobile station does not receive any response to its signalling, the mobile station can only identify that the failure occurs in the uplink traffic. Uplink communication is so called, because it is carried out on the receive frequency of a base station.

In cases wherein a mobile station is in normal mode although uplink communication does not work, the phone can not at all utilize those services of a radio system that require acknowledgements or uplink signalling. If, for example, a mobile station is turned on in the service area of such a base station whose uplink radio frequency, typically system frequency or channel, does not work, and the system requires a successful registration of the mobile station to the system before any actual user information can be transmitted, the mobile station is completely useless to its user, as the base station is not able to receive registration messages transmitted by the mobile station. The same holds true in cases, a mobile station moves from coverage areas of other base stations to an uplink disturbance area. In such a case, a mobile station such as a radiotelephone, cannot update its location information to the system and, thus, is not able in any way to utilize the system services. In such a case, the mobile station begins to scan the frequencies and channels of other base stations in an effort to find a new base station. It is possible that a handover and accomplish switching to another base station, i.e. roaming, succeed, or it may also happen that the base station is not able to find a working base station and its control channel at all, and, as a result, is not able to utilize the services of the mobile communication system.

FIG. 1 shows a situation in which the transmitting power of a mobile station MS is considerably lower than that of a base station BS. In such a case, there may be a prior break in the uplink connection due to differences between up/downlink coverage areas. The figure shows the coverage area of a base station BS by curve C1, and the coverage area of a mobile station MS by curve C2. The aforementioned means that the transmission of the base station BS carries further than from where vehicle-mounted and hand-held mobile stations MS can successfully transmit a radio signal to the base station BS. In this prior art example, the base station does not hear the mobile station MS although the mobile station MS hears the base station BS, and so the mobile station MS begins to search for a new channel, for example, a control channel. If other channels are available, the mobile station moves to them and drops the original call, but if other frequencies or channels are not available, the mobile station cannot utilize the services of the mobile communication network.

In the prior art analog PMR systems (PMR=Private Mobile Radio), criminals have been able to listen to police communications without authorization, and, thus, it has not been necessary to jam the radio transmitter. If, however, such analog, open channel uplink traffic of a mobile communication system or a mobile radio system has been jammed, the mobile stations have remained on the channel whose uplink frequency is jammed and have been able to receive commands from the system dispatcher on a downlink frequency.

In the prior art trunked systems, which are often networks used by the authorities, for example, police radio networks, a high-grade encryption can be implemented, which makes it impossible to listen to traffic between mobile stations and base stations. It is, however, certain that these systems will be jammed by criminals in order to, for example, hinder the police command communications. Technically, it is much easier to jam an uplink than a downlink frequency. As the systems used by the authorities only have a limited number of frequencies, a situation can emerge in which a certain base station can only use one frequency, and the signals of other base stations do not reach all parts of the service area of that certain base station. Furthermore, it is easy to build a jammer which monitors the used frequencies by scanning. For these reasons, disturbance elimination mechanisms that are based on channel circulation are ineffective.

The operation of a radio system can be jammed by a jamming transmitter, by of transmitting on the frequencies in use a radio signal which is more powerful than the utility signal. Jamming can occur both on the transmit (downlink) frequency and the receive (uplink) frequency of a base station. Close to a base station, the downlink radio signal is far stronger than the uplink signal, because of the high transmitting power of a base station, and because the radio signal transmitted by the base station is not significantly attenuated. The level of an uplink radio signal transmitted by a mobile station is lower even at transmission, and, depending on the location of the mobile station, the signal strength may be considerably attenuated close to the base station. Thus, it is much easier to jam an uplink than a downlink signal by a jammer. In practise, the jamming of an uplink signal is the only way to try to hinder the operation of a mobile communication system by way of blocking radio frequencies.

If the spacing of transmit and receive frequencies, the so-called duplex-spacing, i.e. the spacing of uplink and downlink frequencies, is constant, it is possible to efficiently block all the uplink traffic of the base station by an intelligent jammer. An intelligent jammer measures on which downlink channel the base station is transmitting and immediately blocks the corresponding uplink frequency by a jamming transmission, the uplink frequency being at a duplex-spacing distance from the transmit frequency. In such a case, it does not help that the base station changes its transmit/receive frequency if it suspects jamming, because the new frequency will be jammed, too.

FIG. 2 illustrates a possible scenario of jamming of a base station. A gang of criminals robs a bank in an urban area, and they know the location of the base station BS of the police radio network, and set a jammer N on the uplink frequency F1 of the base station BS. The jammed uplink frequency F1 or channel is inoperative, but the corresponding downlink F2 is not. There are police units in the coverage area of the base station BS, and additional units are ordered to the crime scene from elsewhere. The network dispatcher notices a break in uplink frequency F1 in the crime area. The situation may be such that the mobile communication system is economically planned so that the radio cells only have a sufficient enough overlap, i.e. the coverage areas of the base stations overlap as little as possible, and because the crime area is not in the overlap zone, the mobile stations cannot search for a channel to use in the coverage area of some other base station.

In the scenario above, the usual analog, so-called open channel system, functions in the following way: the roaming of mobile stations MS, i.e. handover, is carried out by a manual handover performed by the mobile station user. In an open system, no registration of a mobile station MS to the system is required. In such a case, although the uplink frequency F1 or channel is jammed, the dispatcher can transmit commands to mobile stations MS in the area on the downlink channel or frequency F2 even if it does not receive a response from them. In an open channel system, then, a break in the uplink frequency F1 does not influence the downlink traffic F2. Thus, an open channel has a good jamming resistance.

In the scenario above, a digital trunked system without the operation of the present invention functions as follows. At least an adequate level of security is required of systems used by the authorities, i.e. it is required that mobile stations MS which roam, i.e. switch to a new base station BS, register or at least update their location information to the system. So, in the scenario above, as the registration and location updating requests do not reach the base station BS due to a break in the uplink frequency F1, the mobile stations MS do not accept the channel, but try to search for other control channels of which there are none, because the mobile stations MS are not located in the overlap zone of the base stations BS. As no registration is carried out, the mobile stations MS cannot in any way communicate with the system. The situation above is naturally a serious fault in systems used by the authorities.

Another possible factor blocking uplink traffic is a breakdown of the base station BS receiver or of the mobile station MS transmitter.

SUMMARY OF THE INVENTION

The aim of this invention is to avoid the problems of the prior art solutions described above.

The aim is to offer a method according to which a mobile communication system can function in the best possible way in cases the functioning of an uplink frequency or channel of a base station breaks due to, for example, disturbance or a technical fault. The aim is to make it possible that mobile stations on the downlink frequency of the base station can still receive information from the system, and that other mobile stations possibly entering the coverage area of the base station can utilize the services of the mobile communication network.

This new kind of method for reacting to disturbance in a mobile communication system is obtained by the method of the invention which method is characterized in that it comprises the following steps: a mobile communication network detects the disturbance on an uplink frequency, the mobile communication network informs a mobile station of the disturbance by using a downlink frequency and commands the mobile station to listening mode in which the mobile station stays on the same downlink frequency and receives information from the base station, the mobile station shifts to listening mode.

The invention is based on the idea that as disturbance occurs on an uplink frequency of a base station of a mobile communication system, i.e. on the receive frequency of the base station, the system, for example, a base station, informs the mobile station or radiotelephones of the break in the uplink traffic and, if desired, also the reason for it by a failure report message. In the same context, the mobile communication system orders the mobile station to listening mode. In listening mode, a roaming sequence, i.e. the sequence of a base station change and a handover sequence, alter. In such a case, the mobile station exceptionally stays tuned to the downlink frequency corresponding to the jammed uplink frequency although it does not receive any responses to its signalling because the base station is unable to hear the mobile station due to the disturbance. It should be noted that the mobile station which is requested to shift to listening mode can also behave in another way than to shift directly to listening mode. In a failure report message, a mobile station can also be requested to behave differently. In listening mode, the mobile station does not have to respond to the signalling of the system. In such a case, the services which use both-way traffic of the system in its normal mode can be used as one-way services. The mobile station detects on the basis of the failure report message, or lack of it, the reason for the uplink break and informs the user of it, who can react in an appropriate way on the basis of that report.

An advantage of this kind of a method for reacting to disturbance in a mobile communication system is that the disadvantages of the prior art solution are avoided by this method.

The present invention provides the advantage that a mobile communication system can detect a disturbance situation on an uplink frequency and react to it in the best possible way.

In addition, it is an advantage of the present invention that a mobile station, after it has received a failure report message, shifts to listening mode in which it can receive signalling and user information from the system on the downlink frequency without the normally required both-way signalling with the system. If the mobile station does not receive a failure report message as it detects the break, it can infer that the mobile equipment is faulty, or the break is caused by an inadequate uplink service range, and inform the user of these factors.

It is an advantage of the method of the invention that the mobile station user is always aware of the reason causing the uplink failure. For example, if the failure is caused by jamming, it is not necessary for the user to try to replace his or her unit with a properly working one, because he or she will know that the failure is caused by jamming.

In addition, it is an advantage of the present invention that not only can listening mode be used during a break in the uplink connection but also in cases only downlink traffic is required due to operational needs. In such a case, the power consumption of mobile stations can be reduced, and, for example, wireless silence can be ensured.

It is, furthermore, an advantage of the present invention that it is easier to locate the jammer, as the jammer is the only transmitting device apart from the base station in cases the mobile stations are in listening mode.

In addition, it is an advantage of this invention that, if followed, the services of the mobile communication system in its normal mode can be utilized in the downlink direction even if the uplink frequency of channel were useless.

BRIEF DESCRIPTION OF THE DRAWINGS

In the following, the invention will be described in closer detail with reference to the accompanying drawings, in which FIG. 1 shows the coverage areas of the transmitters of a base station and a hand-held mobile phone in a situation in which the base station has a larger coverage area than the hand-held mobile phone, this figure having been discussed in the Background section of this document, FIG. 2 shows a jamming situation in the operation of a radio system, in which situation the uplink frequency is jammed, and in which a jammer measures the downlink frequency and transmits a jamming signal on an uplink frequency which is at a duplex-spacing distance from the downlink signal 1, this FIG. having been discussed in the Background section of this document, FIG. 3 shows a system diagram of a situation in which a mobile station communicates with a base station, FIG. 4 shows a block diagram of a failure report message of the invention, and, FIG. 5 shows a flowchart of operation of a mobile station of the invention during jamming.

DETAILED DESCRIPTION OF A PREFERRED EMBODIMENT OF THE INVENTION

Figure 5:
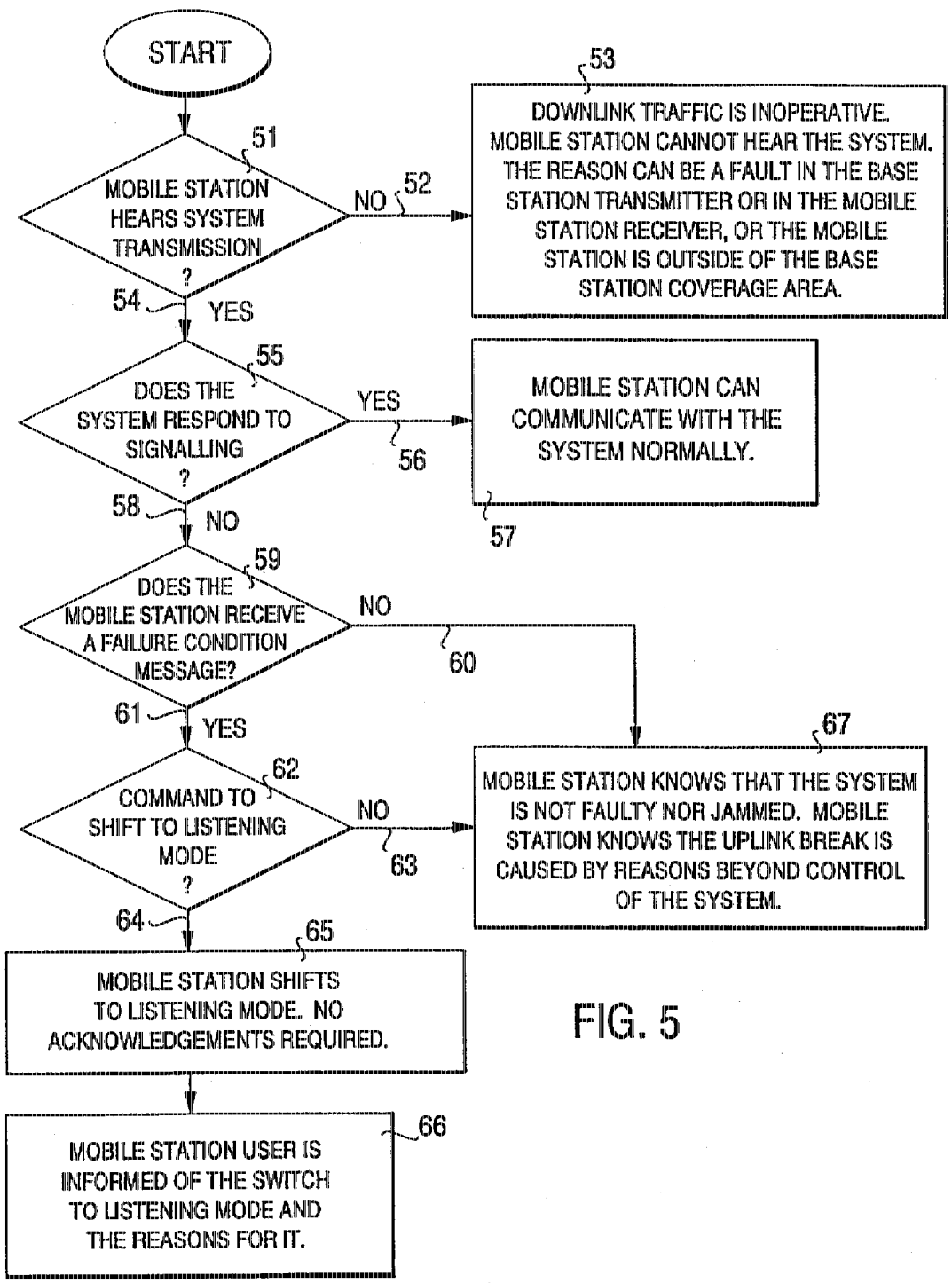

FIG. 3 shows a system diagram of a situation in which a mobile station communicates with a base station. The figure shows a trunking system controller TSC to which a base station BS is connected by data links. A mobile station MS is tuned to the downlink frequency F3 of the base station. There is disturbance on the uplink frequency or channel F4 between the base station BS and the mobile station MS.

As the mobile communication system notices a break in the uplink traffic, it tries to infer the reason for the break. It can be jamming, a breakdown of a radio receiver or some other piece of equipment required in the reception, or some other reason. The break may affect the entire system or just a certain radio frequency or channel.

Here, a break in the uplink traffic detected by the system is understood to refer to a break which affects the mobile stations in the coverage area of the base station.

The system can detect disturbance in the uplink traffic by measuring the strength of the received signal and comparing it to the bit error ratio. The radio system recognizes that the strength of the received signal and the bit error ratio depend on each other. The mobile communication network, i.e. a mobile station or a mobile services switching center, can detect a jamming transmission if a bit error ratio of a signal received at the base station at a predetermined field strength exceeds the corresponding bit error ratio of a corresponding field strength in an undisturbed situation. A digital demodulator can also detect jamming on the basis of different than normal behavior of the received signal.

According to the invention, a mobile communication system couples the information on the break and the reason for it to a broadcast message which it transmits on its downlink frequency or channel in order to inform all or some of the mobile stations of it. This information is called a failure report message. FIG. 4 shows a block diagram of a failure report message of the invention. The failure report message can also be signalled to the radiotelephones by unit/group specific signalling instead of, or in addition to, broadcast signalling.

The fields of a failure report message:
41. message identifier: the system failure report message
42. address of a mobile station such as a mobile station or a group
43. failure description: no disturbance, or jamming or a failure in the base station receiver or other disturbance
44. mode command: listening mode or normal mode
45. test field A failure report message can either be sent continuously or more seldom. The message includes a mode command field which determines the mode of the radiotelephones.

As uplink breaks occur, the mobile station may shift to listening mode. The command to shift to listening mode is included in the failure report message. In listening mode, the system does not require any kinds of acknowledgements from the mobile stations. Registrations are no longer performed, and signalling only takes place in the downlink direction. In such a case, the services of the mobile communication system in its normal mode can be used in the downlink direction. It is also possible to act in such a way that the mobile station user himself or herself upon receiving a request to shift to listening mode gives a manual command that switches the mobile station to listening mode. Before switching a mobile station to listening mode, the right of a mobile station to shift to listening mode can be checked.

As the mobile station in the search sequence of a calling channel has accepted a calling channel and moves onto that, the mobile station reads the identifier information from the calling channel. On the basis of this information, the mobile station knows if it has to update its location information, or not. It is useless for the mobile station to transmit location area updating information to the system in a disturbance situation, because there is disturbance on the uplink frequency or channel of the base station. So, the mobile communication network, i.e. the base station, the trunking controller or the mobile communication system does not acknowlegde anything to the mobile station. The present, prior art, mobile stations retransmit a failed signalling for a few times. Thus, the mobile communication system has to be familiar with the retransmission algorithm, and it has to retransmit a failure report message often enough so that the mobile station does not have time to begin to search for a new calling channel. The transmission rate of a failure report message naturally depends on the length of the time-out which controls the change of a mobile station onto a new frequency. If it is unnecessary for the mobile station to update its location area, the phone receives a failure report message without problems as it listens to a control channel transmitted by the jammed base station.

The following describes the operation of a mobile station which is in listening mode. The mobile communication system determines the mode of the mobile station (listening mode or normal mode). The mobile station functions in a predetermined mode in the mode command field 44 of the failure report message. The mobile station user can be informed of the switch to listening mode and of its reasons by text, sound, and/or indicator lamp signals.

In normal mode, a mobile station searches for a control channel by following a special control channel search sequence. A channel having a high enough field strength, the correct identifier information and which responses to the mobile station signalling is accepted as a control channel. In listening mode, the mobile station discontinues the search sequence of a normal control channel and accepts the control channel even if it does not receive a response to its signalling. The mobile station, then, remains on the interfered channel, but listens to the downlink channel transmitted by the base station, on which downlink channel there is no disturbance.

In listening mode, a mobile station does not have to transmit acknowledgement messages as a response to the system signalling, nor traffic channel information or speech. The mobile station can skip all those procedures which are not essential as far as the reception of downlink traffic is concerned. Such procedures include, for example, all the tasks required for the transmitting of a radio signal.

While in listening mode, a mobile station normally follows the system control, and, for example, shifts to conversation mode as it receives a call initialization message, and thus the mobile station goes to the traffic channel on which a mobile services switching center or a base station directs it.

The mobile communication system informs the mobile stations of jamming and sets the phones to listening mode. In such a case, the mobile stations do not have to register in order to hear downlink traffic. The system dispatcher can give commands to the mobile stations within the area even if it does not receive a response from them. Locating the jammer is also made easier, because it is the only device that is transmitting.

The mobile communication system returns the mobile station or the radiotelephones from listening mode to normal mode by transmitting a failure report message (FIG. 4) in which the value of the mode field 44 is "normal mode". A mobile station can also be programmed to return to normal mode after a predetermined time from the last failure report command.

The mobile station, furthermore, returns to normal mode if its power is turned off; the phone always starts in normal mode.

It is, in addition, possible to return the mobile station from listening mode to normal mode so that the mobile station is returned from listening mode to normal mode by a manual command given by the mobile station user.

In cases wherein the signalling of the mobile station with the system is prevented although the mobile station is still able to receive signals from the base station, the mobile station aims at finding out the reason for the break and informing the user of it. On the basis of failure report information, or lack of it, the mobile station can infer whether the reason for the uplink disturbance is in the system, in the mobile station itself, or in the differences between coverage areas. The inference sequence is illustrated in FIG. 5.

In step 51 of the flow chart of FIG. 5, the mobile station determines whether it can hear transmission from the system. If the mobile station does not 52 hear it, the mobile station makes the estimate 53 that the downlink traffic of the system in question is not operational as the mobile station cannot hear the system. The reason for this can be that the base station transmitter does not work, or that the mobile station receiver does not work, or that the mobile station is outside of the coverage area of the base station of the system. If, however, the mobile station does hear 54 transmission from the system, the mobile station estimates 55 whether the system responds to the signalling the mobile station transmits. If the system responds 56, the mobile station knows that it can communicate with the system in the normal manner 57.

If, however, the system does not respond to the mobile station signalling 58 in an acceptable way, the mobile station begins to observe 59 whether it receives a failure condition message. If the mobile station does not 60 receive a failure condition message, it will know 67 that the system is not faulty and that the system is not jammed. In such a case, the mobile station knows that the uplink break is caused by reasons beyond control of the system. If, however, the mobile station does receive 61 a failure condition message, the mobile station checks 62 whether the failure condition message contains a command to shift to listening mode. If the failure condition report does not contain 63 the failure condition message, the operation of the mobile station proceeds as per step 67.

If, however, the failure condition message contains a command to shift to listening mode 64, the mobile station shifts to listening mode 65 and knows that no transmission to the base station in acknowledgement of the messages it has received is necessary. In the same context, the mobile station user is informed 66 similarly to above of the switch to listening mode and the reason for it.

The drawings and their description are only meant to illustrate the idea of the invention. The method of the invention for reacting to disturbance in a mobile communication system may vary in details within the scope of the claims. Although the invention is above described especially in connection with trunked mobile radio systems, the invention can be utilized in other kinds of mobile communication systems as well.

We claim:

1. A method for reacting to disturbance on an uplink control channel in a digital trunked mobile communication system which includes a mobile communication network having a plurality of base stations maintaining a plurality of control channel pairs constituted by a plurality of uplink control channels respectively paired with a corresponding plurality of downlink control channels, a mobile services switching center, at least one mobile station arranged for signalling with a selected one of said base stations on a said control channel pair including a respective uplink control channel and a respective downlink control channel, said method comprising the steps of:
 (a) detecting by said mobile communication network of an instance of disturbance caused by intentional jamming on said respective uplink control channel;
 (b) informing said mobile station by said mobile communication network of said disturbance, by use of said respective downlink control channel;
 (c) commanding of said mobile station by said mobile communication network to a listening mode, in which said mobile station is forced to remain exceptionally on said respective downlink control channel and is prevented from searching for a new, nonjammed control channel, even though said mobile station fails to receive any response to uplink signalling transmitted by the mobile station to said selected one of said base stations on said respective uplink control channels, and shifting of said mobile station to said listening mode; and (d) transmitting information to said mobile station by said selected one of said base stations, and receiving said information by said mobile station, on said respective downlink control channel, while said mobile station is in said listening mode.

2. The method of claim 1, wherein:

in practicing step (a), said disturbance is detected if a bit error ratio of signalling received at said selected one of said base stations on said respective uplink control frequency, at a predetermined field strength, exceeds a corresponding bit error ratio at a corresponding field strength previously experienced for signalling received at said selected one of said base stations on said respective uplink control frequency in a situation known to have been substantially undisturbed.

3. The method of claim 1, wherein:

in practicing step (a), a digital demodulator of a receiver of said selected one of said base stations detects said disturbance on the basis of reception of signalling by the mobile station on said respective uplink control channel behaving differently from normal.

4. The method of claim 1, wherein:

step (b) includes said mobile communication network transmitting a failure report message to said mobile station.

5. The method of claim 4, wherein:

said failure report message includes information as to the intended meaning of said failure report message, information about said mobile station, information as to the nature of the disturbance which has been detected in step (a), and a command for said mobile station to shift to said listening mode.

6. The method of claim 5, further comprising:

said mobile station, based on reception thereby of said failure report message, providing information to a user of said mobile station as to said disturbance.

7. The method of claim 4, further comprising:

said mobile station, based on reception thereby of said failure report message, providing information to a user of said mobile station as to said disturbance.

8. The method of claim 7, wherein:

said mobile station includes a display, and providing said information to said user includes providing a text message on said display.

9. The method of claim 7, wherein:

said mobile station includes a sound emitter, and providing said information to said user includes providing a sound signal.

10. The method of claim 8, wherein:

said mobile station includes an indicator 1 amp and providing said information to said user includes providing a visually perceivable indication by said indicator lamp.

11. The method of claim 1, wherein:

in practicing step (c), said shifting is accomplished manually by a user of said mobile station, in response to said commanding.

12. The method of claim 11, further comprising:

before practicing of said shifting of step (c), checking whether said mobile station has a right to shift to said listening mode.

13. The method of claim 1, wherein:

in practicing step (c), said shifting is accomplished automatically by said mobile station in response to said commanding.

14. The method of claim 1, further comprising: subsequent to practicing step (d), commanding of said mobile station by said mobile communication network to shift back from said listening mode to a normal mode of operating, and shifting of said mobile station back to said normal mode of operating.

15. The method of claim 14, wherein:

said shifting back is accomplished manually by a user of said mobile station, in response to said commanding to shift back.

* * * * *